United States Patent [19]

MacGregor et al.

[11] Patent Number: 5,595,701
[45] Date of Patent: Jan. 21, 1997

[54] PROCESS FOR MAKING A POLYUREA BACKED PRODUCT WITH A POLYURETHANE SKIN

[75] Inventors: Cline J. MacGregor; Joseph L. Malone, both of Lancaster; Monte H. York, Akron, all of Ohio

[73] Assignee: The Goodyear Tire & Rubber Company, Akron, Ohio

[21] Appl. No.: 440,505

[22] Filed: May 12, 1995

[51] Int. Cl.$^6$ .................................................. B29C 41/22
[52] U.S. Cl. .................... 264/255; 264/46.4; 264/309; 264/331.19; 264/338
[58] Field of Search .................. 264/46.4, 46.6, 264/309, 255, 338, 331.19

[56] References Cited

U.S. PATENT DOCUMENTS

| | | | |
|---|---|---|---|
| 3,576,930 | 4/1971 | Watters et al. | 264/309 |
| 3,872,199 | 3/1975 | Ottinger | 264/46.4 |
| 4,209,564 | 6/1980 | Nomura et al. | 428/315 |
| 4,242,410 | 12/1980 | Konig et al. | 264/255 |
| 4,389,454 | 6/1983 | Horacek et al. | 264/255 |
| 4,465,710 | 8/1984 | Uchiyama et al. | 264/46.5 |
| 4,822,549 | 4/1989 | Verwilst et al. | 264/309 |
| 5,013,508 | 5/1991 | Troester | 264/224 |
| 5,073,318 | 12/1991 | Rohrlach et al. | 264/309 |
| 5,106,547 | 4/1992 | Beck et al. | 264/309 |
| 5,116,557 | 5/1992 | Debaes et al. | 264/309 |
| 5,162,388 | 11/1992 | Primeaux, II | 521/159 |
| 5,171,818 | 12/1992 | Wilson | 528/59 |
| 5,189,075 | 2/1993 | Zimmerman et al. | 521/159 |
| 5,218,005 | 6/1993 | Zimmerman et al. | 521/58 |
| 5,316,822 | 5/1994 | Nishijima et al. | 428/138 |
| 5,411,688 | 5/1995 | Morrison | 264/46.4 |

FOREIGN PATENT DOCUMENTS

WO9323237  11/1993  WIPO .................................. 264/255

OTHER PUBLICATIONS

Texaco Chemical Company Technical Bulletin entitled "Polyurea Spray Technology for Formulators" dated Dec. 15, 1988.
Texaco Chemical Company Technical Bulletin entitled "Polyurea Spray Formulations Based on Aliphatic Isocyanates and Chain Extenders" dated May 16, 1990.
D. J. Primeaux II "100% Solids Aliphatic Spray Polyurea Elastomer Systems," reprinted from Polyurethanes World Congress (1991).
Texaco Chemical Company bulletin "Chemical Resistance Testing for Polyurea Spray Elastomers" (1990/1991).
Joe Schrantz, "Polyurea Coatings: A Promising Future," Industrial Finishing (Oct. 1992).

*Primary Examiner*—Allan R. Kuhns
*Attorney, Agent, or Firm*—Bruce J Hendricks

[57] ABSTRACT

The present invention relates to a process for making a polyurea foamed backed product with a polyurethane skin. The process involves (a) providing a mold surface, (b) applying a polyurethane paint to the inner surface of the mold to provide a coated inner surface and (c) spraying at least one polyurea layer onto said coated inner surface to form an integral foamed backed polyurea product with a polyurethane skin.

7 Claims, No Drawings

PROCESS FOR MAKING A POLYUREA BACKED PRODUCT WITH A POLYURETHANE SKIN

BACKGROUND OF THE INVENTION

Polyurethane-backed products with a polyurethane skin are well known for use as automobile dashboards. Unfortunately, the polyurethane materials will react with moisture in the air to generate $CO_2$ which will cause the material to foam, reduce its density and generate various size voids in the polyurethane layer. The degree to which this occurs depends on humidity and in extreme cases, such as high humidity summer days, renders the process unusable. Control of this variable has previously required that costly humidity controls be installed on the spray booth air makeup units. Problems may also be encountered on extremely low humidity days in the winter, causing the material density to rise and its thickness to decrease, increasing material usage to achieve the desired thickness.

Polyurea materials, due to their intrinsic rapid reaction rates, are almost impervious to moisture variation. This is due to the fact that the polymer forming reaction is preferred over the reaction of the isocyanate with water to generate $CO_2$. Therefore, there exists a need for a process which is insensitive to ambient moisture variation.

SUMMARY OF THE INVENTION

The present invention relates to an efficient process for making a polyurea-backed product with a polyurethane skin. The process is characterized by providing a mold surface and applying a polyurethane paint to the inner surface of the mold to provide a coated surface. Next, at least one polyurea layer is sprayed onto the coated polyurethane surface of the mold to form an integral polyurea-backed product with a polyurethane skin.

DETAILED DESCRIPTION OF THE INVENTION

The first step of the present process is to provide a mold. The mold should be the female configuration to the desired shape of the end product. The inner surface mold may be consist of rubber, silicone, synthetic resin or metal. Preferably, the mold surface is of a silicone material.

A partitioning or release agent may be initially applied on the inner surface of the mold to assist in the eventual removal of the polyurea-backed product from the mold inner surface. Representative examples of release agents include soaps, waxes and silicones. Such release agents are typically suspended or dissolved in suitable organic or aqueous solvents. After application of the release agent, the treated surface is dried.

After application of the release agent, if used, the inner surface of the mold may be heated. For example, the mold surface may be at a temperature ranging from about 20° to 85° C. Preferably, the surface temperature of the mold ranges from about 40° to 70° C.

According to the process of the present invention, a polyurethane paint is applied to the inner surface of the mold. The polyurethane paint well became the "skin" of the mold. The polyurethane paint provides ultraviolet protection to the underlying polyurea structure of the product. Conventional two component-reacting-type polyurethane paints or one component-type polyurethane paint may be used. Preferably, a polyurethane paint is used that is water-borne. A particularly preferred polyurethane paint is commercially available from Glidden under the commercial designation Plastishield™. Use of such water-borne single component urethane coatings are more environmentally friendly.

The polyurethane paint layer may be applied to inner surface of the mold by any conventional means, such as spray or other means of application. The thickness of the polyurethane application generally ranges from 0.01 mm to 0.10 mm in thickness. Preferably, the thickness of the polyurethane application ranges from 0.02 to 0.04 mm. Depending on the type of paint and product, more than one coat of the polyurethane may be applied to the inner surface of the mold.

After the polyurethane paint is applied to the inner surface of the mold, the paint may be dried. The degree of drying the paint may vary, depending on the circumstances. The paint may be air dried or by the application of heat. Generally speaking, however, the paint is partially dried and the polyurea is applied prior to complete drying of the paint.

Similar to the polyurethane paint, the surface temperature of the mold may be heated prior to application of the polyurea. For example, the surface temperature of the mold may be heated to a temperature ranging from about 30° to 60° C. Preferably, the surface temperature ranges from 35° to 45° C.

As known to those skilled in the art, polyureas are polymers formed by the reaction of isocyanates (Compound A) with primary or secondary amine-terminated polyols (Compound B). The polyisocyanate material may be any, including known, compound or mixtures thereof, having two or more isocyanate groups bonded to an organic radical. The polyisocyanate may be a monomeric polyisocyanate or, preferably, the reaction product of a monomeric polyisocyanate with polyoxyalkylene polyamine, such as a polyurea polyisocyanate quasi-prepolymer. The term "quasi-prepolymer" describes a mixture of monomers and oligomers, essentially dimers, made using a stoichiometric excess of one type of monomer, in this case polyisocyanate, as compared with the other monomer, i.e. polyamine. Polyisocyanates include compounds shown by Formula 1.

$$R\text{-}(NCO)_z \qquad (1)$$

In Formula 1, R is an organic unsubstituted or halosubstituted aromatic group having from 6 to 25 carbon atoms and a valence of Z. Z can be straight or branched chain, acyclic, cyclic or heterocyclic; saturated, unsaturated or include unsubstituted or halosubstituted aromatic. Preferably, R has from about 6 to about 12 carbon atoms. The number of isocyanate groups, defined by z, is at least 2, preferably from 2 to about 4, and most preferably 2. Typical polyisocyanates include p-phenylene diisocyanate, polymethylene polyphenyl isocyanate, 2,4-/2,6-toluene diisocyanate (TDI), dianisidine diisocyanate, bitolylene diisocyanate, naphthalene -1,4-diisocyanate, bis(4-isocyanatophenyl)methane, bis(3-methyl-3-isocyanatophenyl)methane, bis(3-methyl-4-isocyanatophenyl)methane, 4,4-diphenylpropane diisocyanate and methylene-bridged polyphenyl polyisocyanate mixtures, such as those containing methylene diphenyldiisocyanate isomers like methylene bis(4-phenylisocyanate)(MDI); alkaryl and aralkyl diisocyanates, such as tetraalkylxylene diisocyanates like tetramethylxylene diisocyanate; trimerized or biuretic polyisocyanates.

The polyoxyalkylene polyamine, such as used to make either polyisocyanate quasi-prepolymer or as the component which reacts with polyisocyanate, may be any, including known, polyoxyalkylene polyamine, including mixtures thereof. The polyoxyalkylene polyamine can be a primary and/or secondary amine-terminated polyether polyol typically having: a weight average molecular weight of more than about 100 and preferably from about 200 to about 5,000; a functionality of from 2 to 6, and preferably from 2 to 3; and an amine equivalent weight of from about 750 to about 4,000. Polyoxyalkylene polyamines include compounds shown in Formula 2:

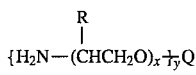
(2)

Wherein Q is the polyvalent residue of an active hydrogen-containing compound used as an initiator. The valence of Q is given by y, where y is at least 2, preferably from 2 to 8, and most preferably 2 to 3. Each R is independently hydrogen or lower alkyl, such as methyl or ethyl. The R groups are preferably hydrogen and/or methyl, including mixtures. The average number of oxyalkylene repeating units per amine group, given by x, is at least 1, preferably from about 1 to about 100, and most preferably from about 1.5 to about 7.

Typical initiators include, among others, one or more of the following: polyhydroxy compounds, including diols like ethylene glycol, propylene glycol, 1,2- or 1,4-butanediols and triols like trimethylolpropane and glycerine. Preferred initiators include ethylene glycol, propylene glycol, trimethylolpropane and glycerine.

Typical oxyalkylene repeating units include oxyethylene, oxypropylene, oxybutylene and so on, including mixtures thereof. When two or more oxyalkylenes are used, they may be present in any form such as randomly or in blocks. Preferred polyoxyalkylene polyamines include JEFFAMINE® polyaoxyalkylene amines from Texaco Chemical Co Inc, such as polypropylene oxide diamines, D-2000 and D-4000 and polypropylene oxide triamines T-5000.

The relative amount of monomeric polyisocyanate to polyoxyalkylene polyamine mixture is at least a stoichiometric excess of monomeric polyisocyanate to polyoxyalkylene polyamine. Generally more than 1, preferably from about 1.5 to about 25, and most preferably from about 10 to about 25, equivalent moles of isocyanate are used per mole of amine.

Although no additional ingredients, such as solvent or catalyst, are needed or preferred to conduct the reaction, any other suitable materials may be present, if desired.

The reaction between the monomeric polyisocyanate and the polyoxyalkylene polyamine may be conducted under any suitable, including known, conditions for effecting reactions between isocyanates and amines. Typically, reactions are conducted under ambient temperature and pressure. Since the reaction precedes rapidly, the ingredients are preferably thoroughly mixed, such as using a high speed mixer.

The (B) compound of the polyurea includes an amine terminated polyoxyalkylene polyol and optionally diamine chain extenders. The amine terminated polyoxyalkylene polyol is preferably selected from diols or triols and, most preferably, includes a blend of diols and/or triols. The particular polyols, i.e., diols and/or triols, employed in compound (B) are the same as those described hereinabove in connection with the quasi-prepolymer of compound (A).

The diamine chain extender of compound (B) can include diethylenetoluenediamine (DETDA), cis-1,4-diaminocyclohexane; isophoronediamine; m-xylylenediamine; 4,4-methylenedicyclohexylamine; menthanediamine; 1,4-diaminomethylcyclohexane and substituted derivatives thereof. Laromin® C-260, available from BASF Corp is representative of a substituted 4,4-methylenedicyclohexylamine derivative. In a most preferred embodiment, the diamine chain extender of component (B) is diethylenetoluenediamine (DETDA).

Other conventional formulation ingredients may be employed in compound (A) or (B) as needed, such as, for example, foam stabilizers, also known as silicone oils or emulsifiers. The foam stabilizers may be an organic silane or siloxane. For example, compounds may be used having the formula:

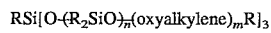

wherein R is an alkyl group containing from 1 to 4 carbon atoms; n is an integer of from 4 to 8; m is an integer of from 20 to 40 and the oxyalkylene groups are derived from propylene oxide and ethylene oxide. See, for example, U.S. Pat. No. 3,194,773.

Reinforcing materials, if desired, useful in the practice of our invention are known to those skilled in the art. For example, chopped or milled glass fibers, chopped or milled carbon fibers and/or other mineral fibers are useful.

Post curing of the polyurea is optional. Post curing will improve some elastomeric properties, such as heat sag. Employment of post curing depends on the desired properties of the end product. Generally speaking, the polyurea is allowed to cure for a period of time ranging from 1 minute to 20 minutes.

The (A) component and (B) component of the polyurea are combined or mixed under high pressure; most preferably, they are impingement mixed directly in the high pressure spray equipment which is, for example, a GUSMER® H-V proportioner fitted with a GUSMER Model GX-7 spray gun. In particular, a first and second pressurized stream of components (A) and (B), respectively, are delivered from two separate chambers of the proportioner and are impacted or impinged upon each other at high velocity to effect an intimate mixing of the two components and, thus, the formation of the elastomer system, which is then coated onto the desired substrate via the spray gun.

The volumetric ratio of the (A) component to the (B) component is generally from about 30 to 70 percent to about 70 to 30. Preferably, component (A) and component (B) are employed in a 1:1 volumetric ratio.

Advantageously, the (A) and (B) components react to form the polyurea without the aid of a catalyst.

The thickness of the polyurea ranges from 0.5 mm to 2.5 mm. More than one layer may be applied.

Once the polyurea has been applied, the polyurea-backed product with the polyurethane skin may be removed from the inner surface of the mold.

The following examples are provided to further illustrate various aspects of the present invention.

EXAMPLE 1

To one side of a grained flexible 30.5 cm×30.5 cm mold surface comprised of silicone (Silastic™ from Dow Chemical) was applied two layers of a sodium oleate release agent. After the release agent air dried, the mold was heated to 54° C. Thereafter, two coats of the polyurethane paint were sprayed on the inner surface. The polyurethane paint was applied to a thickness of 0,025 mm (0.8 mils). The polyurethane paint is commercially available from Glidden under the designation 757-R312. The viscosity of the paint was 23 seconds in a Zahn No 4 cup. The paint was sprayed on the silicone surface using a HVLP DeVilbiss™ spray gun using 15-pound fluid delivery pressure, 30 psi atomization pressure and a velocity of 30.5 cm/sec. The paint was cured in an oven for 2.5 minutes at 54° C. The mold temperature was then lowered to 38° C. and the polyurea layer was applied using a GX-7-400 Gusmer™ spray gun equipped with a Gusmer Markson™ proportionator. The polyurea was mixed at 2,000 psi and 71° C. The diisocyanate was Rubinate™ X9015 and the amine-terminated compounds were a 70.8/29.2 by weight blend of Jeffamine D-2000 and Ethacure 100. The diisocyanate, an amine-terminated compound, was from Texaco Chemical Company. The volume ratio of isocyanate to amine-terminated compounds was 1:1. After the polyurea was sprayed on the painted surface, the polyurea was cured for 5 minutes prior to demolding.

The polymer backing had a tensile strength of 2415 psi, an elongation of 280 percent, a tear strength of 440, a Shore D hardness of 48 and a 100 percent modulus of 1645 psi.

The polyurea foamed backed item was tested according to existing automotive specifications. After aging the item at 120° C. for 21 days, the item retained 57 percent of the original elongation. After 28 days at 120° C., the item retained 54 percent of the original elongation.

An automotive red color was used for the tests since red is the most difficult color for stability in aging. The color stability was measured after these same aging conditions and Delta E was 0.99 after 21 days and 1.5 after 28 days at 120° C.

What is claimed is:

1. A process for making a polyurea-backed product with a polyurethane skin comprising:

(a) providing a mold surface;

(b) applying a polyurethane paint to the inner surface of the mold to provide a coated polyurethane surface;

(c) combining or mixing a polyisocyanate with a polyoxyalkylene polyamine, in a volume ratio of from about 30 to 70 percent to about 70 to 30 percent to form a mixture; and (d) spraying said mixture to form at least one polyurea layer onto the polyurethane surface of the coated mold to form an integral polyurea-backed product with a polyurethane skin.

2. The process of claim 1 wherein prior to applying said polyurethane paint, a release agent is applied to the surface of the mold.

3. The process of claim 1 wherein the mold surface is selected from the group consisting of rubber, silicone, synthetic resin and metal.

4. The process of claim 1 wherein the polyurethane paint is applied to the mold surface in a thickness ranging from 0.01 mm to 0.10 mm.

5. The process of claim 1 wherein the mold surface is at a temperature ranging from 20° to 85° C. at the time the polyurethane paint is applied.

6. The process of claim 1 wherein, after the polyurethane paint is applied, the paint is dried before any polyurea is sprayed onto the polyurethane paint.

7. The process of claim 1 wherein, after the polyurethane paint has been applied to said inner surface, said inner surface of the mold is heated to a temperature ranging from 30° to 60° C.

* * * * *